US011102464B2

(12) United States Patent
Craner

(10) Patent No.: US 11,102,464 B2
(45) Date of Patent: *Aug. 24, 2021

(54) SYSTEMS AND METHODS FOR RECORDING PROGRAMS USING A NETWORK RECORDING DEVICE AS SUPPLEMENTAL STORAGE

(71) Applicant: Rovi Guides, Inc., San Jose, CA (US)

(72) Inventor: Michael L. Craner, Chester Springs, PA (US)

(73) Assignee: Rovi Guides, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/406,455

(22) Filed: May 8, 2019

(65) Prior Publication Data

US 2019/0268582 A1 Aug. 29, 2019

Related U.S. Application Data

(63) Continuation of application No. 14/047,411, filed on Oct. 7, 2013, now abandoned, which is a continuation
(Continued)

(51) Int. Cl.
*H04N 9/79* (2006.01)
*H04N 21/2747* (2011.01)
(Continued)

(52) U.S. Cl.
CPC ........... *H04N 9/7921* (2013.01); *H04N 5/782* (2013.01); *H04N 7/17318* (2013.01);
(Continued)

(58) Field of Classification Search
CPC .................................................. H04N 5/44543
(Continued)

(56) References Cited

U.S. PATENT DOCUMENTS

| 7,917,008 B1* | 3/2011 | Lee .......................... H04N 5/76 386/291 |
| 2002/0066113 A1* | 5/2002 | Utsunomiya .... H04N 21/43622 725/146 |

(Continued)

FOREIGN PATENT DOCUMENTS

JP 11-345446 12/1999

*Primary Examiner* — Daniel T Tekle
(74) *Attorney, Agent, or Firm* — Haley Guiliano LLP

(57) ABSTRACT

Systems and methods for recording programs using a user's equipment and a network recording device are provided. An interactive television application may determine whether the user's equipment has sufficient resources (e.g., tuners or space) to record a program selected for recording. If the interactive television application determines that the user's equipment does not have sufficient resources, the interactive television application may select, automatically or in response to a user instruction, the program for recording with a network recording device. In some embodiments, the user may have to pay for the use of the network recording device, or may be required to purchase a given tier level of service. The interactive television application may play back programs from the network recording device as VOD offerings, or may direct the network recording device to transfer recorded programs to the user's equipment when it has sufficient resources.

19 Claims, 10 Drawing Sheets

Related U.S. Application Data of application No. 11/267,200, filed on Nov. 4, 2005, now Pat. No. 8,582,946.

(51) Int. Cl.
| | |
|---|---|
| *H04N 21/4147* | (2011.01) |
| *H04N 5/782* | (2006.01) |
| *H04N 7/173* | (2011.01) |
| *H04N 21/433* | (2011.01) |
| *H04N 21/442* | (2011.01) |
| *H04N 21/472* | (2011.01) |
| *H04N 21/488* | (2011.01) |
| *H04N 21/47* | (2011.01) |
| *H04N 21/431* | (2011.01) |
| *H04N 5/45* | (2011.01) |
| *H04N 5/765* | (2006.01) |
| *H04N 5/781* | (2006.01) |
| *H04N 5/85* | (2006.01) |

(52) U.S. Cl.
CPC ..... *H04N 21/2747* (2013.01); *H04N 21/4147* (2013.01); *H04N 21/4316* (2013.01); *H04N 21/4334* (2013.01); *H04N 21/44231* (2013.01); *H04N 21/47* (2013.01); *H04N 21/47214* (2013.01); *H04N 21/4882* (2013.01); *H04N 5/45* (2013.01); *H04N 5/765* (2013.01); *H04N 5/781* (2013.01); *H04N 5/85* (2013.01)

(58) Field of Classification Search
USPC ........................................ 386/295
See application file for complete search history.

(56) References Cited

U.S. PATENT DOCUMENTS

| | | | |
|---|---|---|---|
| 2004/0221019 A1* | 11/2004 | Swildens | H04L 67/1008 709/217 |
| 2006/0271975 A1* | 11/2006 | Sun | H04N 5/76 725/87 |
| 2008/0184327 A1* | 7/2008 | Ellis | H04N 21/4135 725/134 |

* cited by examiner

SYSTEMS AND METHODS FOR RECORDING PROGRAMS USING A NETWORK RECORDING DEVICE AS SUPPLEMENTAL STORAGE

CROSS-REFERENCE TO RELATED APPLICATIONS

This application is a continuation of U.S. patent application Ser. No. 14/047,411, filed Oct. 7, 2013, which is a continuation of U.S. patent application Ser. No. 11/267,200, filed Nov. 4, 2005 (now U.S. Pat. No. 8,582,946), the disclosures of which are hereby incorporated by reference herein in their entireties.

BACKGROUND OF THE INVENTION

This invention is directed to systems and methods for recording programs on a network recording device when a user's local equipment lacks sufficient resources to do so.

Recording devices, such as digital video recording (DVR) devices, are well known in the art. Some DVR systems may include multiple tuners for simultaneously recording multiple programs. Such systems, however, can only simultaneously record as many programs as they have tuners available, because each tuner only records one program at a time. If a user's DVR system has two tuners and the user would like to record, for example, three NCAA tournament college basketball games that are being played at the same time, the user would be forced to choose two of the games for recording and not record the third game.

Available storage space is also a constraint on a DVR's ability to record programs. When sufficient space is unavailable for a recording, the user must either cancel the recording or delete a recording from the DVR. Additionally, bandwidth limitations may be a constraint on simultaneously recording multiple programs. For example, the aggregate bandwidth required of the hard disk in a DVR may limit the ability of a DVR device to record more than a certain number of programs simultaneously.

Accordingly, it would be desirable to provide digital recording systems and methods for recording more programs than the system has resources to record.

SUMMARY OF THE INVENTION

This and other objects of the present invention are accomplished in accordance with the principles of the present invention by providing systems and methods for recording programs on a network recording device when a user's local equipment lacks sufficient resources to do so.

The user's equipment includes an interactive television application, such as an interactive program guide. The interactive television application allows the user to initiate or schedule programs for recording by a recording device, also included in the user's equipment. At an appropriate time (e.g., when a recording is scheduled or initiated, or at a time prior to performing a recording), the interactive television application determines whether the user's equipment has sufficient resources to perform its recordings. For example, the interactive television application may determine whether there will be a sufficient number of tuners free for recording programs simultaneously, or may determine whether the recording device will have sufficient space for recording programs over a given period of time.

If the user's equipment lacks sufficient resources to perform one or more of the recordings, the interactive television application transmits a request to a remote network recording device to perform the recording or recordings. The network recording device may respond to the request by recording the program(s) or, in some embodiments, by holding an already-stored program for the user (e.g., programs already recorded as a consequence of a similar request from another user's equipment on the same network). The interactive television application may subsequently allow the user to play back the programs from the remote network recording device, or download the programs from the network recording device when resources are available and store them locally for playback.

The interactive television application may select which recordings to perform locally, and which recordings to perform on the network recording device, using any suitable approach. In some embodiments, the interactive television application prompts the user to indicate which recordings to perform locally or on the network recording device. In some embodiments, the interactive television application automatically selects which recordings to perform locally or on the network recording device based on, for example, whether or not programs are already recorded by the network recording device, recording options (e.g., a recording priority) or characteristics (e.g., theme, actor) of the programs scheduled for recording. In some embodiments, the network recording device may record programs that it anticipates will be requested. The network recording device may identify such programs by, for example, a trending algorithm run on present or historical requests, and/or thresholding the number of requests for a program (e.g., actual number of requests or as compared to the number of requests for another program).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
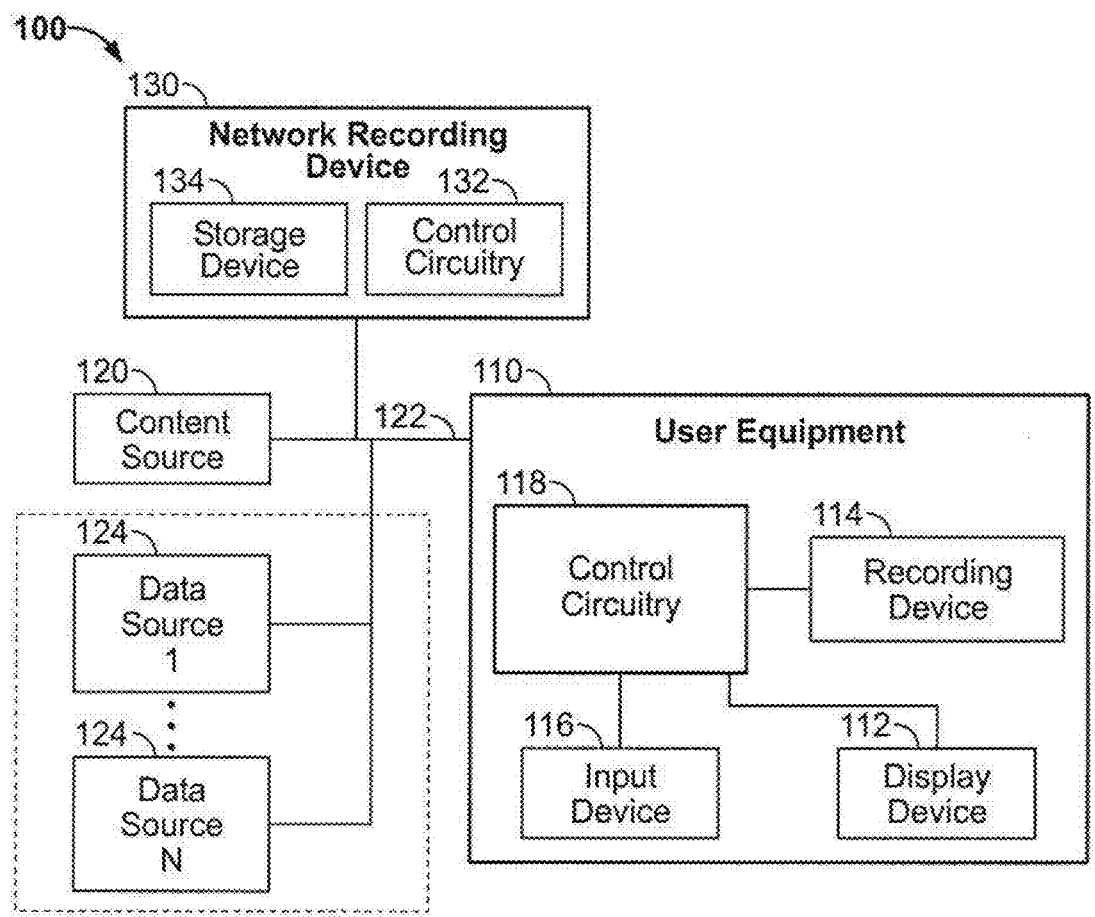
FIG. 1 is a diagram of an illustrative interactive television system in accordance with one embodiment of the present invention.

FIG. 1 shows illustrative interactive television system 100 in accordance with one embodiment of the invention. User equipment 110 receives content in the form of signals from content source 120 over communications path 122. In practice there may be multiple content sources 120 and user equipment 110, but only one of each has been shown in FIG. 1 to avoid over-complicating the drawing.

Content source 120 may be any suitable content source such as, for example, a cable system headend, satellite television distribution facility, television broadcast facility, on-demand server (e.g., VOD server), Internet-based server, IPTV server, or any other suitable facility or system for originating or distributing content. Content source 120 may be configured to transmit signals over any suitable communications path 122 including, for example, a satellite path, a fiber-optic path, a cable path, or any other suitable wired or wireless path. The signals may carry any suitable content such as, for example, television programs, music, news, web services, games, applications, or any other suitable content.

User equipment 110 may include any equipment suitable for providing an interactive television experience. User equipment 110 may include television equipment such as a television, set-top box, game machine, recording device, video player, user input device (e.g., remote control, keyboard, mouse, touch pad, touch screen and voice recognition interface) or any other device suitable for providing an interactive television experience. For example, user equipment 110 may include a DCT 1200, 3500, 5100, 6208 or 6412 set-top box provided by Motorola, Inc. In some embodiments, user equipment 110 may include computer equipment, such as a personal computer with a television card (PCTV).

In the example of FIG. 1, user equipment 110 includes at least control circuitry 180, display device 120, recording device 140, and user input device 116, which may be implemented as separate devices or as a single device. An interactive television application, such as an interactive television program guide, may be implemented on user equipment 110 to display, on display device 120, the content transmitted by content source 120 over path 122 and to provide interactive television application features.

Recording device 140 may be a personal video recorder (PVR), digital video recorder (DVR), video cassette recorder (VCR), DVD-recorder, or any other suitable video recorder. Recording device 140 may include one or more tuners.

Display device 120 may be any suitable device such as, for example, a television monitor or a computer monitor. Display device 120 may also be configured to provide for the output of audio.

Control circuitry 180 is adapted to receive user inputs from input device 116 and execute the instructions of the interactive television application. Control circuitry 180 may include one or more tuners (e.g., analog or digital tuners), encoders and decoders, decrypters, processors (e.g., MIPS family processors), memory (e.g., RAM and hard disks), communications circuitry (e.g., cable modem circuitry), input/output circuitry (e.g., graphics circuitry or display adapter), connections to the various devices of user equipment 110, and any other suitable component for providing analog or digital television programming, program recording, and interactive television features. In some embodiments, control circuitry 180 may be included as part of one of the devices of user equipment 110 such as, for example, part of recording device 140, display 120, or any other device (e.g., a set-top box, television and/or video player).

Any suitable number of users may have equipment, such as user equipment 110, connected to content source 120 and one or more data source 124. But for the clarity of the figure, the equipment of only a single user is shown. The equipment of the plurality of users may be connected to content source 120 and data source 124 using a cable television network or any other suitable means. In some embodiments, the equipment of the plurality of users may be connected to each other using any suitable means (e.g., home network or Internet via broadband cable modem).

User equipment 110 may receive interactive television application data from one or more data sources 124. Data sources 124 may provide data for a particular type of content or for a particular application. For example, one data source 124 may provide data for non-on-demand assets (e.g., non-pay and pay-per-view television programs), and another may provide data for on-demand assets (e.g., VOD programs). Or, for example, a single data source may provide both of these types of data. For example, one data source 124 may provide data for an interactive television program guide. Another data source 124 may, for example, provide data for another interactive television application running on user equipment 110 (e.g., a home shopping application). In some embodiments, data sources 124 may provide data to the interactive television application using a client/server approach. There may be one server per data source, one for all sources or, in some embodiments, a single server may communicate as a proxy between user equipment 110 and various data sources 124.

FIG. 1 shows content source 120 and data sources 124 as separate elements. In practice, their functionality may be combined and provided from a single system at a single facility, or multiple systems at multiple facilities. For example, one content source 120 and data source 124 may be combined to provide VOD content and associated VOD data.

Illustrative interactive television system 100 includes network recording device 130. Network recording device 130 may be any suitable type of recording device including, for example, a PVR, DVR, DVD-recorder, hard-drive arrays, a server, or any other suitable device for recording program selected by one or more instances of user equipment 110. In some embodiments, network recording device 130 may be a standalone device, part of user equipment 110, part of content source 120, part of any other device in interactive television system 100, or a combination of any of the above.

Network recording device 130 may include control circuitry and a storage device for performing at least recording operations. For example, network recording device 130 includes at least control circuitry 132 and storage device 134. Control circuitry 132 may include one or more tuners, processors, memory (e.g.; RAM), communications circuitry, connections to the various devices of interactive television system 100, and any other suitable component. Control circuitry 132 receives instructions from the interactive television application on one or more instances of user equipment 110. The instructions may include, for example, recording programs, deleting programs, generating a stream to transmit programs, (e.g., as VOD offerings), modifying the deleting priorities, or any other suitable instruction(s).

In response to receiving instructions from the interactive television application, control circuitry 132 directs tuners to tune to channels carrying programs requested for recording by other devices of interactive television system 100 (e.g., by user equipment 110) and records the programs in storage device 134. In some embodiments, control circuitry 132 stores in storage device 134 information related to recorded programs such as, for example, recording options, recording attributes, deleting options, instructions from devices of interactive television system 100, or any other suitable information. In some embodiments, network recording device 130 may access (e.g., via ftp over an IP network) the content directly from content source 120 without requiring a tuner.

Figure 2:
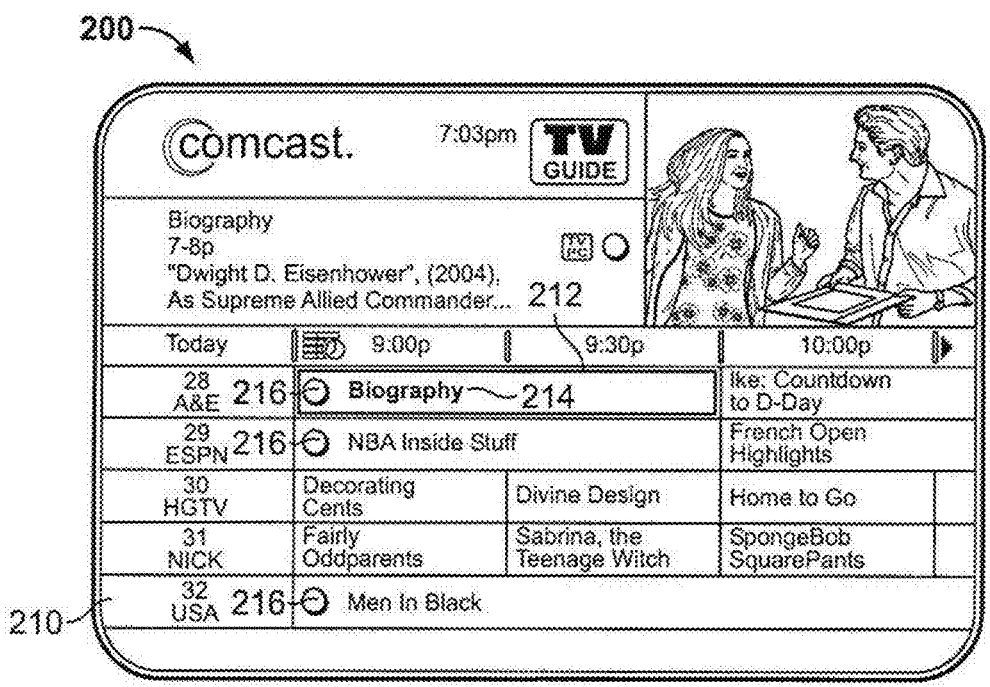
FIG. 2 shows an illustrative display screen showing television listings in accordance with one embodiment of the present invention.

FIG. 2 shows illustrative program guide screen 200 that may be displayed on display 120. The user may access program guide screen 200 by any suitable means such as, for example, pressing a "menu/" "guide," or other suitable key or key sequence on user input device 116, navigating from another program guide screen or menu, or by any other means known in the art. Illustrative program guide screen 200 contains a grid of program listings 210, which includes program titles, channels, scheduled broadcast times. The screen may include any other suitable program information. In other embodiments, the program guide screen may include a list (i.e., a single column) of programs. The user may select a desired program listing with highlight region 212 using user input 116, or any other suitable means.

To schedule a program or other suitable video for recording, a user may highlight a desired program, as shown in FIG. 2 where "Biography" on channel 28 is highlighted, and press a "Record" key or key sequence, or select a "Record" option from the screen using user input device 116. Any suitable device from user equipment 110, for example recording device 140, may record the program. In response to receiving an instruction to record the program, the interactive television application may place icon 216 on the listing associated with the selected program to indicate to the user that the interactive television application has scheduled the program for recording (e.g., in FIG. 2, Biography, Inside Stuff and Men In Black are scheduled for recording at the same time).

Figure 3:
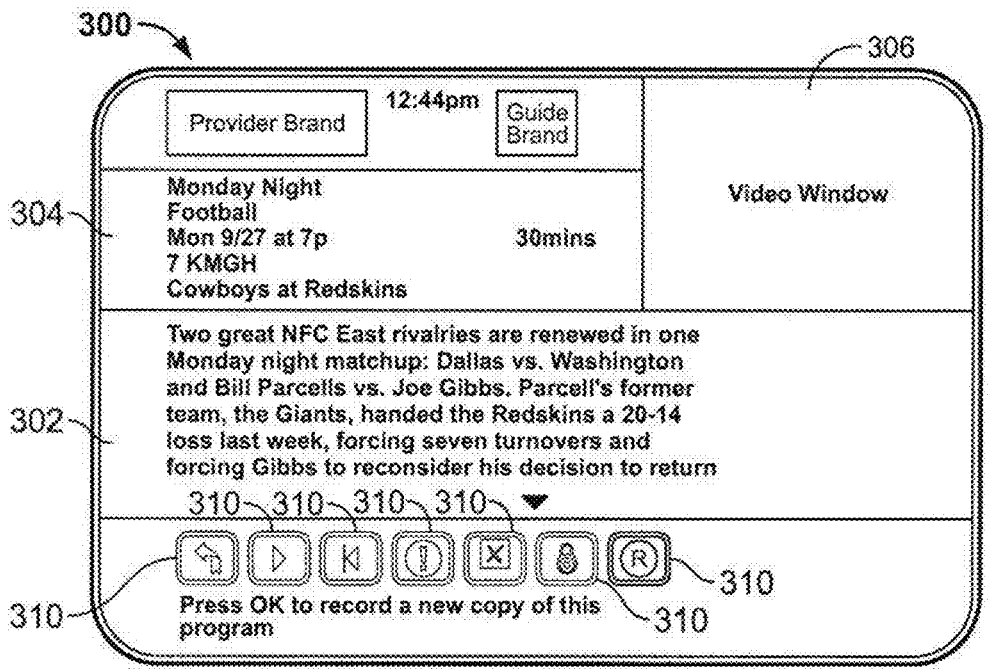
FIG. 3 shows an illustrative display screen showing information relating to a television program in accordance with one embodiment of the present invention.

Prior to choosing to record a program, the user may request additional information regarding the program. For example, the user may highlight a listing using highlight region 212 and press an "Information" key or key sequence on user input device 116. In response to receiving the user request, the interactive television application may display an information screen. FIG. 3 shows illustrative Information screen 300, which includes detailed information section 302, program description area 304 (including the program title, time and channel), and video window 306. Screen 300 also includes selectable icons 310, some or all of which may include text descriptions. The screen may include options for recording, series recording, parental lock, or any other suitable interactive television application action. If a user determines that he wants to record the program, the user may schedule the recording by pressing a "Record" key or key sequence, selecting a "Record" option from the screen using a user input device (e.g., user input device 116), or by any other suitable means.

Figure 4:
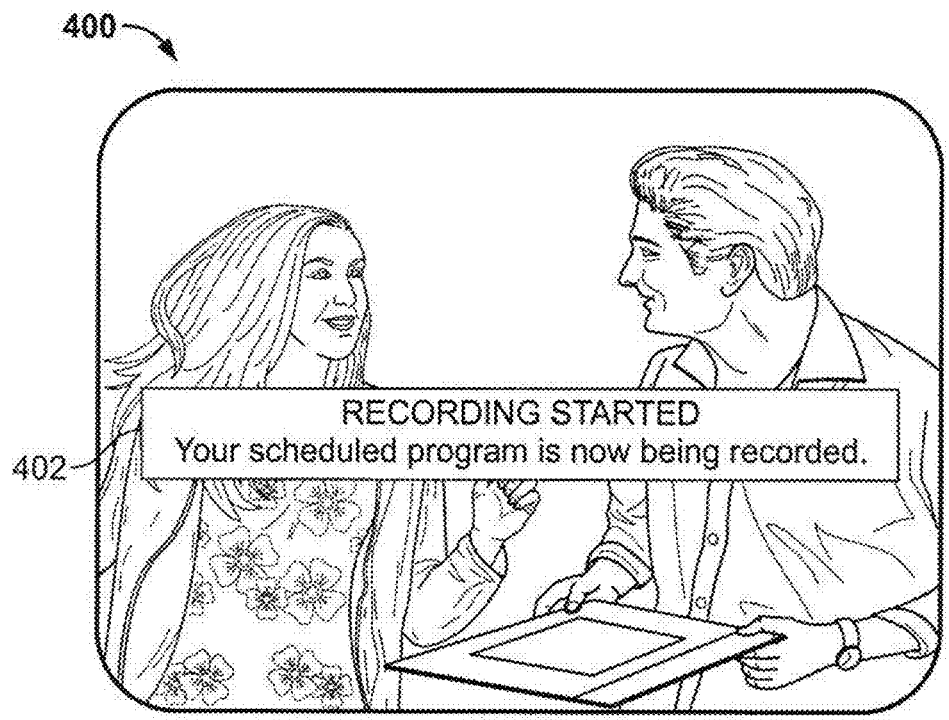
FIG. 4 shows an illustrative display screen showing a television program in full screen after a recording has commenced in accordance with one embodiment of the present invention.
Figure 5:
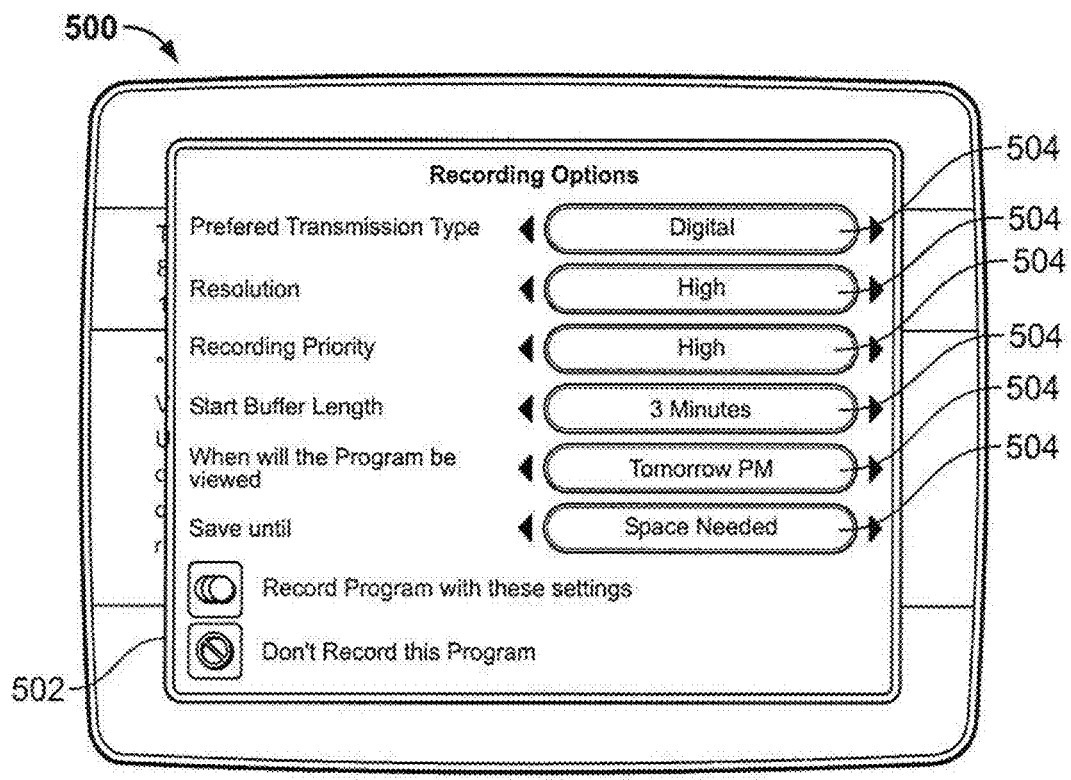
FIG. 5 shows an illustrative display screen showing recording options in accordance with one embodiment of the present invention.

In some embodiments, the user may be watching a program on display device 120 in a full screen view, for example full screen view 400 shown in FIG. 4, and decide to record the program. To record the program, the user may press a "Record" key or key sequence on user input device 116, or use any other suitable means. A pop-up notice, such as pop-up notice 402, may appear to confirm that recording has begun. Such a notice may also appear in response to receiving a user confirmation to record the program (e.g., in response to a user confirming the recording with menu 502 of FIG. 5). In some embodiments, pop-up notice 402 may appear automatically when a previously-scheduled recording commences.

In some embodiments, the interactive television application may prompt the user to set recording options for the program. For example, the interactive television application may display a screen or pop-up, such as recording options screen 500 shown in FIG. 5. Recording options screen 500 includes pop-up menu 502, which includes a plurality of recording options 504. Recording options 504 include the transmission type, resolution, recording priority, start buffer length, when the user intends on viewing the program, and how long to save the copy. In some embodiments, the recording options pop-up menu may include any other suitable recording option (e.g., end buffer length, how many copies to record and which channel to record). In some embodiments, the interactive television application may automatically set recording options for the program.

At an appropriate time (e.g., when a recording is scheduled or initiated, or at a time prior to performing a recording), the interactive television application determines whether the user's equipment has sufficient resources to perform its recordings. For example, the interactive television application may determine whether the user's equipment has enough tuners available to record multiple programs simultaneously. The interactive television application may determine tuner availability based on current, scheduled, or anticipated uses (determined, for example, from user viewing habits) of the tuners in the user's equipment. As another example, the interactive television application may determine whether the recording device of the user's equipment has enough space to perform its recordings. The interactive television application may determine whether the recording device has enough space by comparing the space available for recording programs with the estimated space required for performing each current or scheduled recording.

In response to determining that the user's equipment does not have sufficient resources to perform its recordings, the interactive television application transmits a request to the network recording device to perform one or more of the recordings. The request may be, for example, an indication that the user's equipment does not have sufficient resources to perform one or more of the recordings. In response to the request, the network recording device may perform one or more of the recordings, or hold one or more already-recorded programs for the user.

In some embodiments, when a user initiates a recording while viewing a program the interactive television application determines that the user's equipment does not have sufficient resources for the recording, the interactive television application may automatically direct the network recording device to perform the recording. This may allow for an uninterrupted viewing experience for the user. Alternatively, the interactive television application may prompt the user for an instruction to perform the recording with the network recording device or to make resources available to perform the recording locally.

In addition to transmitting the request to the network recording device, the interactive television application may cancel the local recordings that the network recording device performs. Alternatively, rather than canceling the local recording, the interactive television application may suspend the local recording in case resources become available prior to the transmission of the program. If resources do become available for performing the recording, the interactive television application may cancel the recording with the network recording device and remove the suspension on the local recording of the program.

The interactive television application may, in response to determining that the user's equipment does not have sufficient resources to perform all of its recordings, select which programs to record locally with the user's equipment and which programs to record remotely with the network recording device. In some embodiments, this selection is made automatically. The interactive television application may use any suitable criteria for making the selection. For example, the interactive television application may determine to perform a particular recording with the user's equipment or network recording device based on a recording option (e.g., recording priority), the transmission type of the program (e.g., first run or re-run, digital or analog transmission), program theme (e.g., sporting event), whether the network recording device has access to the program or has already recorded the program, whether the program has already been recorded or requested to be recorded with the network recording device by the user's equipment or another device, or based on any other suitable criteria.

In some embodiments, the user may set a global option that instructs the interactive television application to request the network recording device to perform recordings for programs satisfying particular criteria. The criteria may include, for example, a recording option (e.g., recording priority), the transmission type of the program (e.g., first run or re-run, digital or analog transmission), program theme (e.g., sporting event), whether the program has already been recorded with the network recording device, or any other suitable criteria. The global setting may instruct the interactive television application to automatically purchase space on the network recording device if it is necessary to record a program. In some embodiments, the user may set more restrictive criteria for recording programs on the network recording device when purchasing additional space is necessary and/or expensive. In embodiments where each user is provided a particular amount of network storage (e.g., as a function of tier of service) and additional storage may be purchased, criteria for recording a program with the network recording device may include whether or not and/or how much purchased network recording space would be used on a user-by-user basis (e.g., depending on the user's budget).

Figure 6:
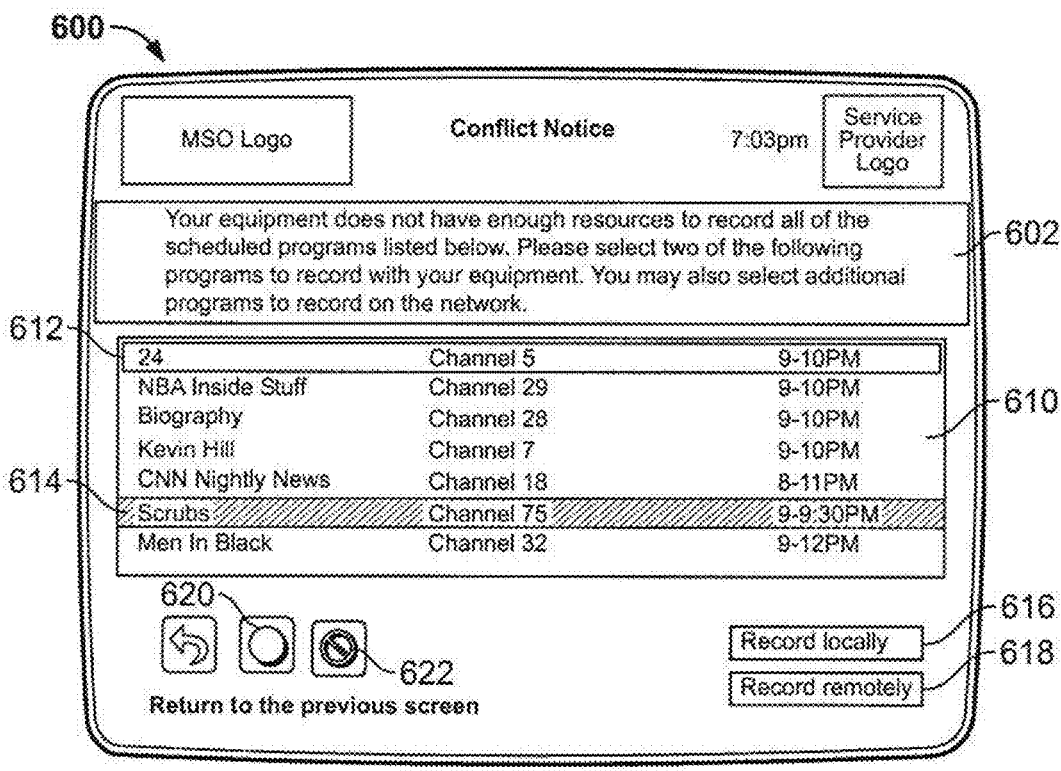
FIG. 6 shows an illustrative display screen showing an illustrative conflict notice for the user's equipment in accordance with one embodiment of the present invention.

In some embodiments, the interactive television application may prompt the user for an indication of whether to perform one or more recordings with the user's equipment or the network recording device. One suitable prompt may be conflict notice 600, shown in FIG. 6.

Notice 600 includes description section 602 and listing 610. Description section 602 indicates to the user that the user's equipment has insufficient resources and cannot record all of the programs originally scheduled. In some embodiments, the description section may include an indication of which resource is lacking (e.g., not enough tuners available or not enough space). Description section 610 prompts the user to select two programs to record locally, with the user's equipment. Description section 610 also prompts the user to select programs to record with a network recording device. In some embodiments, the description section may also describe a default action.

Listings 610 include the program name, channel number and transmission time. The listings may include any other suitable information including, for example, channel name, transmission date, actors, brief description, or any other suitable information. The user may select a listing by controlling highlighted region 612 with user input device 116. To select a program for recording with the user's equipment, the user may highlight the listing associated with the program and select a "Record locally" option (e.g., button 616). Similarly, to select, a program for recording with the network, recording device, the user may highlight the listing associated with the program and select a "Record remotely" option (e.g., button 618).

Figure 7:
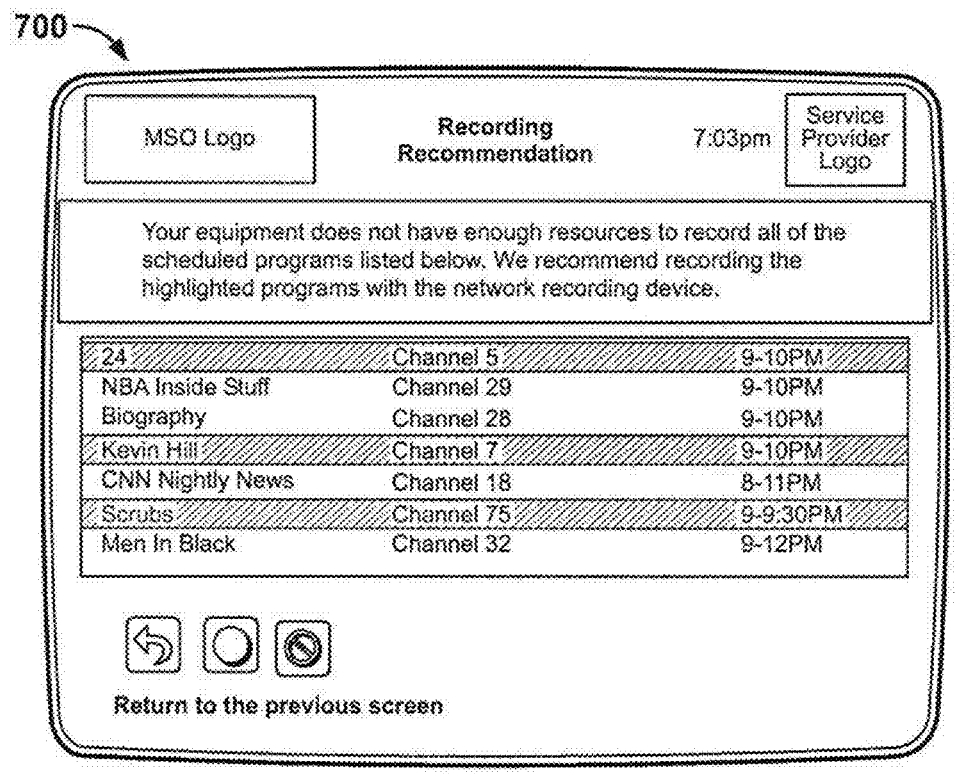
FIG. 7 shows an illustrative display screen showing a recommendation for recording program with a network recording device in accordance with one embodiment of the present application.

In some embodiments, the interactive television application may recommend to the user which programs to record with the network recording device and which programs to record with the user's equipment. For example, the interactive television application may determine whether the network recording device has already recorded a program. If a recorded program is identified, the interactive television application may recommend to the user that the program not be recorded with the user's equipment, but instead be saved by the network recording device for the user (see for example, recommendation notice 700 of FIG. 7). In response to receiving a user designation to have a program saved by the network recording device, the interactive television application may, for example, direct control circuitry 132 to modify an entry of storage device 134 that is associated with the previously recorded program (e.g., set the deleting priority of the program to "do not delete," "do not flush," or "save").

The interactive television application may determine whether a program selected for recording is already recorded with the network recording device in any suitable manner. For example, the interactive television application may request and receive from the network recording device a list of already recorded programs with the network recording device, and compare those programs to the programs selected for recording with the user's equipment that the user's equipment does not have sufficient resources to record. The interactive television application may then direct the network recording device to save the programs that are both already recorded with the network recording device and originally selected for recording with the user's equipment.

As another example of an approach for determining whether a program selected for recording is already recorded with the network recording device, the network recording device may receive from the interactive television application a list of programs selected for recording that the user's equipment does not have the resources to record. The network recording device may then compare the selected programs with the programs that are already recorded with the network recording device, and save for the user the selected programs that are already recorded with the network recording device. The network recording device may also direct the interactive television application to cancel or suspend the corresponding recordings with the user's equipment.

In some embodiments, the interactive television application may determine, either automatically or in response to receiving a notice from the network recording device, that the network recording device cannot or will not perform a recording for a particular program. The interactive television application may then, in response to the determination, recommend that the user's equipment perform the recording. For example, the network recording device may lack sufficient resources (e.g., when the network recording device is an additional recording device of the user's equipment) to record the program. As another example, the network recording device may be subject to legal limitations on which programs it may record (e.g., due to agreements between the providers of the content source and the network recording device). Alternatively, if the network recording device will not record a program, the interactive television application may perform a function to enable the network recording device to record the program (e.g., purchase additional storage space on the network recording device).

The user or the interactive television application may select which recordings are performed by which device to attempt to maximize any suitable criteria. For example, the criteria may include maximizing the use of the user's equipment's resources (e.g., tuners and/or space) and minimizing the user's use of the network recording device. This may be advantageous to minimize the user's costs for performing recordings. As another example, the criteria may include minimizing the total use of resources of the network recording device. The interactive television application would then direct the user's equipment to record the programs that are not already recorded with the network recording device, and direct the network recording device to save the already recorded programs. As still another example, the criteria may include recording programs that have a higher recording priority with the user's equipment and programs with a lower recording priority with the network recording device.

In some embodiments, the interactive television application may differentiate for the user the recordings that the user's equipment will perform and the recordings that the network recording device will perform using any suitable means including, for example, placing a colored border around the listings, changing the color of the listing (e.g., colored region 614 in FIG. 6), changing the font of the listing, displaying an icon by the listing, or any other suitable means. The user may confirm which recordings to perform with the user's equipment and network recording device by selecting a record option from notice 600 (e.g., icon 620), or may instead cancel which recordings to perform with the user's equipment and network recording device by selecting a cancel option (e.g., icon 622).

In some embodiments, the service provider operating the network recording device may charge a fee for every recording the network recording device performs on behalf of the user. As another example, the network recording device may charge a daily, weekly, or monthly fee for unlimited recording, or for a performing a certain number of recordings. As still another example, the amount of space that the user may use on the network recording device may depend on the tier of service purchased by the user (e.g., silver member, gold member). Users having purchased the highest tier of service may perform more recordings with the network recording device than users having purchased the lowest tier of service.

The interactive television application may prompt the user for personal information required to purchase additional storage space on the network recording device (e.g., a higher tier of service) from the service provider when the user has exceeded the amount of space allotted to him. In response, the user may enter a PIN or other information to complete the purchase. Once the purchase has been completed, the service provider may release the additional space to the user.

Figure 8:
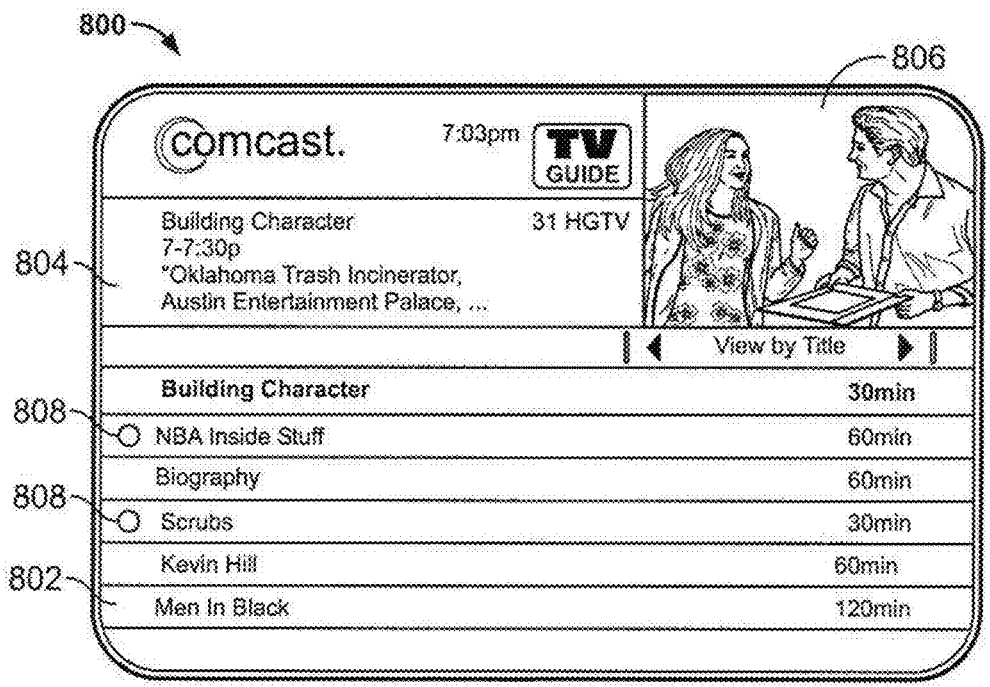
FIG. 8 shows an illustrative display screen showing a listing of recorded programs in accordance with one embodiment of the present application.

The interactive television application may display a recorded programs menu for the user to view recordings performed by the user's equipment and the network recording device. One such menu is menu 800 shown in FIG. 8, which a user may access by pressing a "Recorded Programs Menu" key or key sequence, navigating from another interactive television application screen (e.g., selecting a "Recorded Programs Menu" option from an interactive television application screen using user input device 116), or by any other suitable means. Menu 800 includes recorded programs listings 802, detailed information section 804 and video window 806. Listings 802 include program length, program title, channel number. The listings may include any other suitable information.

In some embodiments, the listings may include both programs recorded with the user's equipment and programs recorded with the network recording device. In some embodiments, the interactive television application may distinguish the programs recorded with each recording device by marking the listings associated with programs recorded with the user's equipment or recorded with the network recording device (e.g., by placing an icon such as icon 808 besides the listing, placing a colored border around the listing, changing the color of the listing or changing the font of the listing). Alternatively, the listings for programs recorded with each device may be separate (e.g., two sets of listings, one for the user's equipment and one for the network recording device). In some embodiments, the interactive television application may not differentiate between the programs so as to keep the display as simple as possible for the user. In some applications, some or all of the programs that the network recording device has recorded on behalf of other users of the network are displayed to the user. The interactive television application may use any suitable filter to limit the number of programs recorded on behalf of other users that are displayed. The filter may be a recommendation engine (e.g., similar to the personal VOD and PPV recommendation engine provided by Choicestream of Cambridge, Mass.).

To play back a recorded program, the user may select the listing associated with the program from listings 802. If the selected program was recorded with the user's equipment, the interactive television application may direct the user's equipment to play back the program by, for example, directing the display device to display the selected program.

If, however, the selected program were recorded with the network recording device, the network recording device may transmit the program to the interactive television application in preparation for local playback. For example, in response to a request to play back the program, the network recording device may provide the program to the user as a VOD offering and transmit the program to the user's equipment as a stream. As another example, the network recorder may transfer the program to the user's equipment for the interactive television application to play back the program locally (provided the user's equipment has sufficient resources to receive the program).

During the course of operation, the interactive television application may free resources by, for example, deleting recorded programs. For example, the interactive television application may delete programs that are stored on both the user's equipment and the network recording device (e.g., programs that the network recording device recorded on behalf of another user) and that are being held by the network recording device for the user. The interactive television application may also autodiscover or autoconfigure additional storage devices, and add additional storage space (e.g., by automounting a hard drive or autodiscovering additional recording devices that have been added to the user's equipment). The interactive television application may then determine whether the freed resources are sufficient to transfer a program from the network recording device to the user's equipment. Alternatively, the interactive television application may periodically determine whether the user's equipment has sufficient free resources for transferring a program. In response to determining that the user's equipment has sufficient resources, the interactive television application may, automatically or in response to a user's instruction, transfer a program from the network recording device to the user's equipment. This may be advantageous, for example, when a user pays for the time the network recording device is used. Once a program is transferred, the interactive television application may direct the network recording device to delete the program or remove the previously set "do not delete" deleting priority.

Other uses for a combination of a network recording device and a user's equipment are described in commonly owned U.S. patent application Ser. No. 11/267,469, filed Nov. 4, 2005, entitled "SYSTEMS AND METHODS FOR RECORDING PROGRAMS WITH A NETWORK RECORDING DEVICE UPON FAILURE OF A USER'S EQUIPMENT," and incorporated herein in its entirety.

Figure 9:
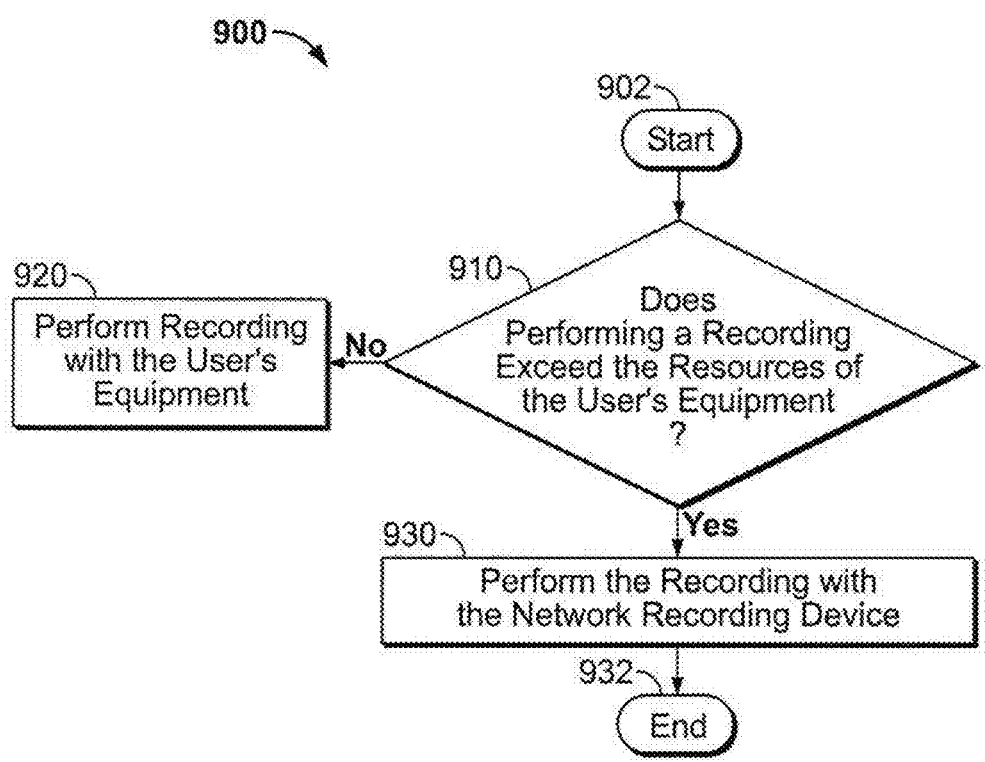
FIG. 9 shows a flow chart of an illustrative process for performing a recording with a network recording device when the user's equipment lacks sufficient resources to perform the recordings in accordance with one embodiment of the present invention.

The following flow charts serve to illustrate processes involved in some embodiments of this invention. FIG. 9 is a flow chart of an illustrative process for performing a recording using a network recording device when the user's equipment does not have sufficient resources. Process 900 begins at step 902. At step 910, the interactive television determines whether performing a recording would exceed the resources of user equipment 110 (FIG. 1). For example, the interactive television application may determine whether user equipment 110 has enough tuners and enough space available to perform the recording. The interactive television application may identify current, scheduled and anticipated uses of the resources of the user's equipment to determine whether the user's equipment will have sufficient resources. The interactive television application may perform step 910 any number of times and at any time up to the transmission time of the program.

If the interactive television application determines that performing the recording would not exceed the resources of user equipment 110, process 900 moves to step 920, where the interactive television application directs user equipment 110 to perform the recording. If instead the interactive television application determines that performing the recording would exceed the resources of user equipment 110, process 900 moves to step 930. At step 930, network recording device 130 (FIG. 1) performs the recording. Process 900 ends at step 932.

Figure 10:
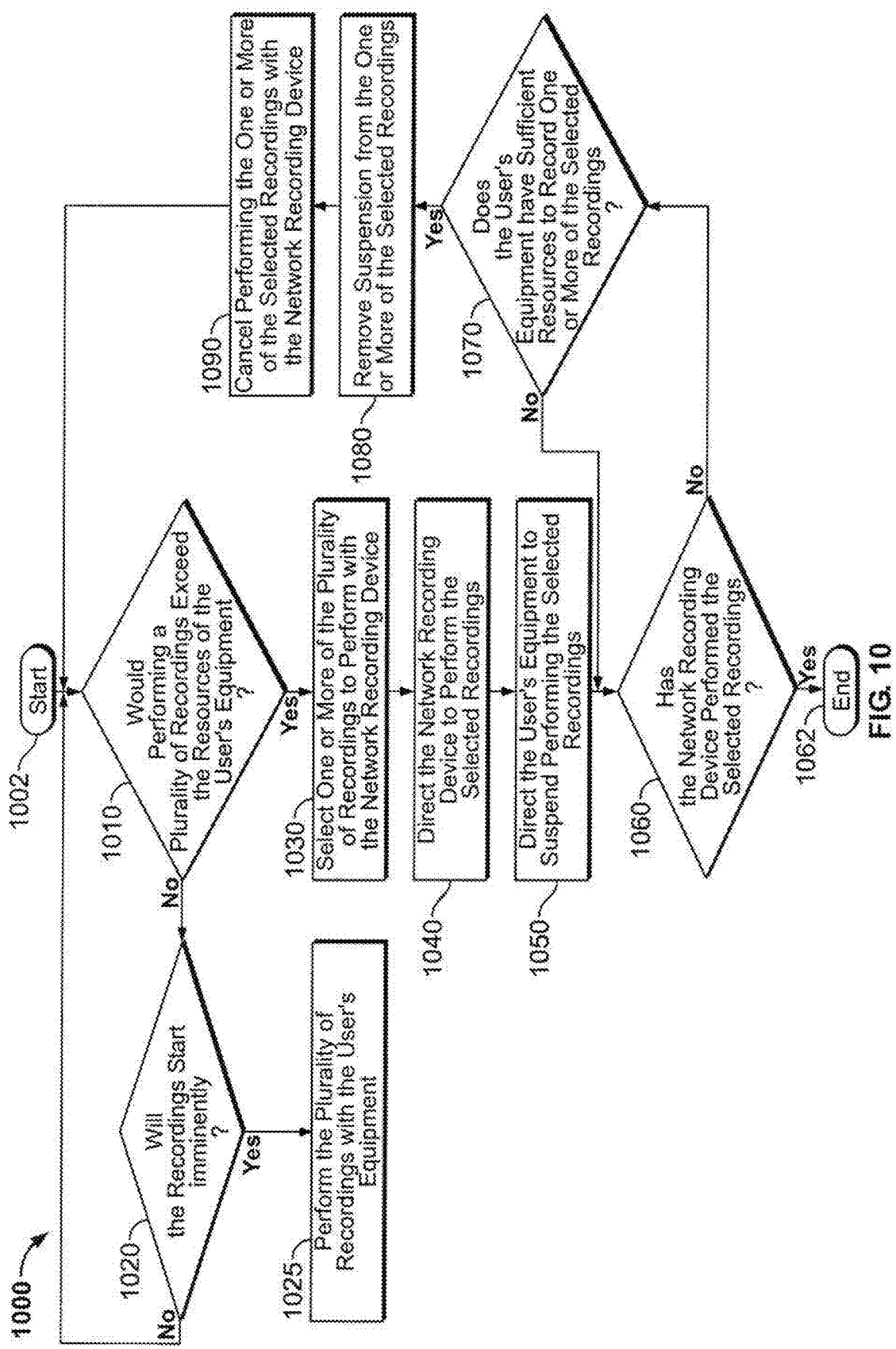
FIG. 10 shows a flow chart of an illustrative process for performing a plurality of recordings with a network recording device when the user's equipment lacks sufficient resources to perform the plurality of recordings in accordance with one embodiment of the present invention.

FIG. 10 is a flow chart of an illustrative process for recording a program using a network recording device when the user's equipment does not have sufficient resources. Process 1000 starts at step 1002. At step 1010, the interactive television application determines whether performing a plurality of recordings would exceed the resources of user equipment 110 (FIG. 1). For example, the interactive television application may determine whether user equipment 110 has enough tuners and enough space available to perform the recording. If the interactive television application determines that performing the recording would not exceed the resources of user equipment 110, process 1000 moves to step 1020.

At step 1020, the interactive television application determines whether the recordings will start imminently. If the interactive television application determines that the recordings will start imminently (e.g., a few minutes before the recordings are to start), process 1000 moves to step 1025 where user equipment 110 performs the recordings. If instead the interactive television application determines that the recordings will not start imminently, process 1000 moves back to step 1010 to determine whether there has been a change in the resources available to the user's equipment for performing the plurality of recordings.

If, at step 1010, the interactive television application determines that performing the recording would exceed the resources of user equipment 110, process 1000 moves to step 1030. At step 1030, the interactive television application selects one or more of the plurality of recordings to perform with network recording device 130 (FIG. 1). Step 1030 may be a predefined process such as, for example, process 1100 (FIG. 11) or process 1200 (FIG. 12). At step 1040, the interactive television application directs network recording device 130 to perform the recordings selected at step 1030. At step 1050, the interactive television application directs user equipment 110 to suspend performing the selected recordings.

At step 1060, the interactive television application determines whether the network recording device has performed the selected recordings. If the interactive television application determines that the network recording device has performed the selected recordings, process 1000 ends at step 1062. If instead the interactive television application determines that the network recording device has performed the selected recordings, process 1000 moves to step 1070.

At step 1070, the interactive television application determines whether user equipment 110 has sufficient resources to record one or more of the selected recordings. If the interactive television application determines that user equipment 110 does not have sufficient resources, process 1000 moves back to step 1060. If instead the interactive television application determines that user equipment 110 has sufficient resources, process 1000 moves to step 1080. At step 1080, the interactive television application removes the suspension from the one or more of the selected recordings to all user equipment 110 to record those recordings. At step 1090, the interactive television application cancels performing the one or more of the selected recordings with network recording device 130. Process 1000 then moves back to step 1010.

Figure 11:
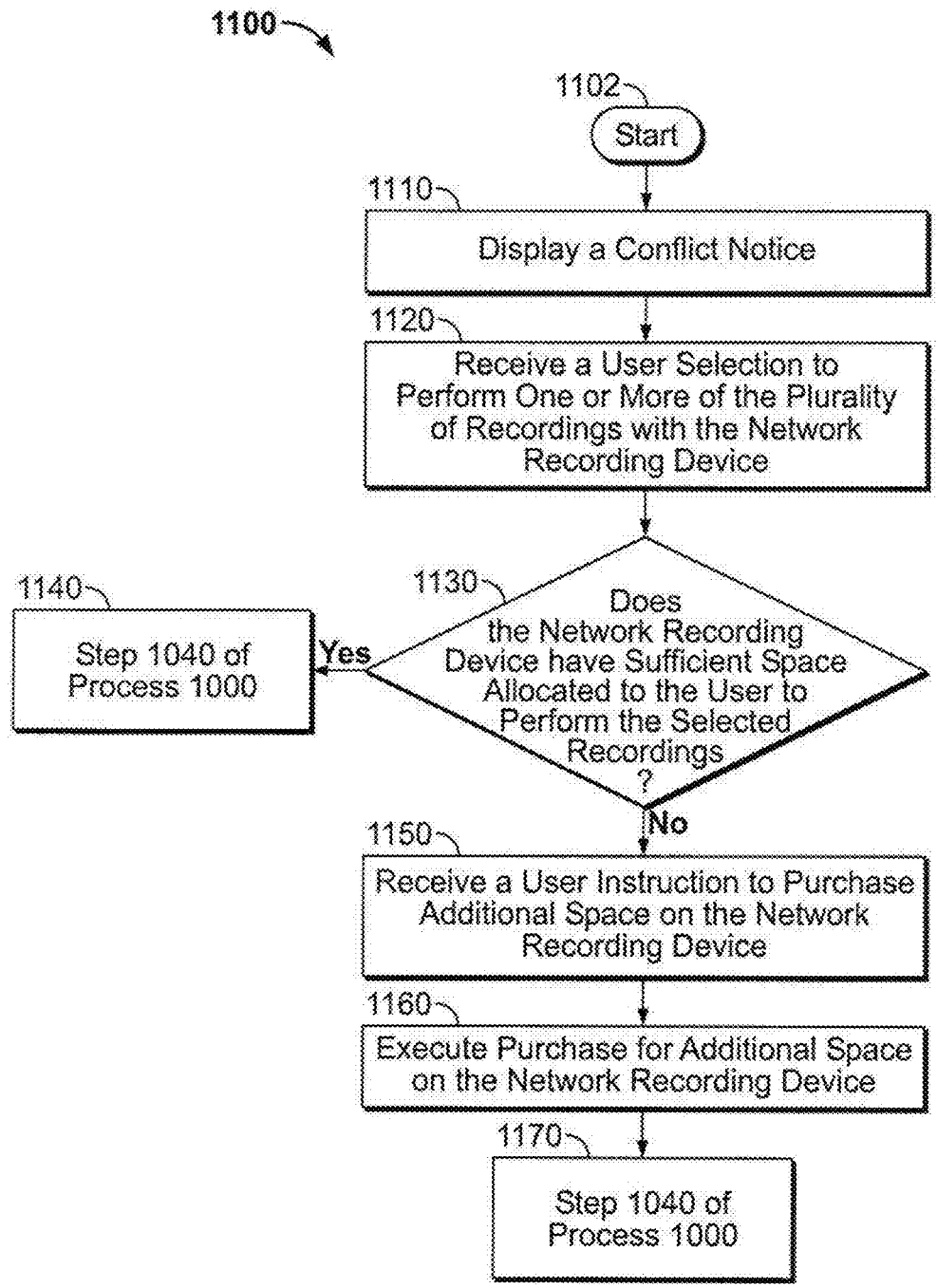
FIGS. 11-12 show flow charts of illustrative processes for selecting whether to record a program with a network recording device in accordance with one embodiment of the present invention.
Figure 12:
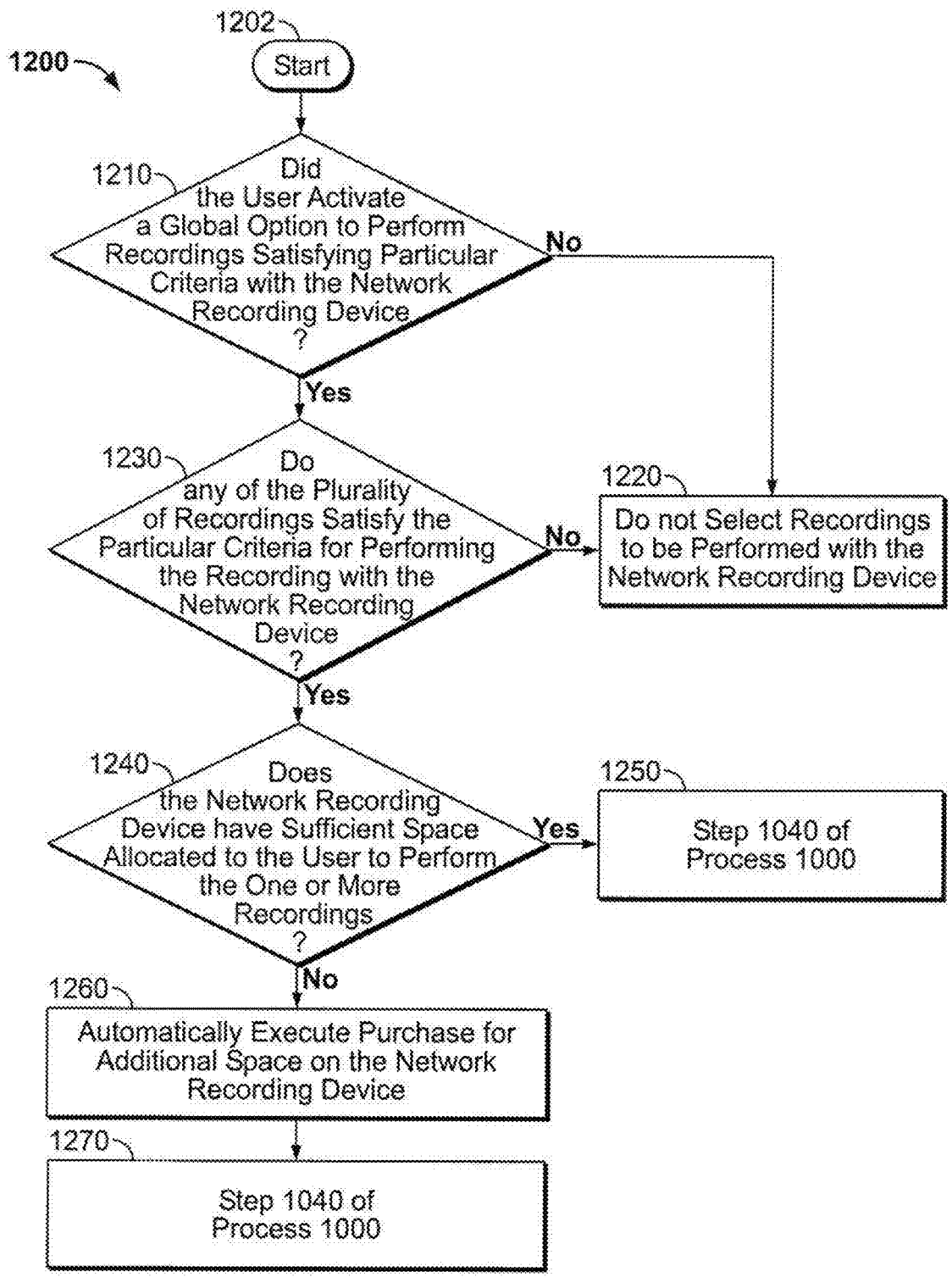

FIGS. 11 and 12 are flow charts of illustrative processes for selecting one or more recordings from a plurality of recordings to perform with the network recording device. Illustrative process 1100 thus takes place during step 1030 of process 1000. Process 1100 begins at step 1102, which is step 1010 of process 1000. At step 1110, the interactive television application displays a conflict notice to the user informing the user that one or more of a plurality of recordings cannot be performed with user equipment 110 (FIG. 1). The conflict notice may also prompt the user to select one or more of the plurality of recordings to perform with network recording device 130 (FIG. 1) instead of user equipment 110. At step 1120, the interactive television application may receive a selection from the user to perform one or more of the plurality of recordings with network recording device 130.

At step 1130, the interactive television application determines whether network recording device 130 has sufficient space allocated to the user to perform the selected one or more of the plurality of recordings. If the interactive television application determines that network recording device 130 has sufficient space, process 1100 moves to step 1140, at which the process 1100 returns to process 1000 and performs step 1040. If instead the interactive television application determines that network recording device 130 does not have sufficient space, process 1100 moves to step 1150.

At step 1150, the interactive television application receives a user instruction to purchase additional space on network recording device 130. For example, the user may purchase additional space for the selected one or more of the plurality of recordings. As another example, the user may purchase a higher tier of service. The user may provide the interactive television application with personal information (e.g., a PIN or a credit card number) to execute the purchase. At step 1160, the interactive television application executes the purchase for more space on network recording device 130. At step 1170, process 1100 returns to process 1000 and performs step 1040.

Illustrative process 1200 takes place during step 1030 of process 1000. Process 1200 begins at step 1202, which is step 1010 of process 1000. At step 1210, the interactive television application determines whether the user activated a global option to perform recordings satisfying particular criteria with network recording device 130 (FIG. 1). The particular criteria may include, for example, recording options, program attributes (e.g. program theme or actors), whether user equipment 110 (FIG. 1) has sufficient resources to perform the recording, or any other suitable criteria. If the interactive television application determines that the user did not active the global option, process 1200 moves to step 1220, where no recordings are selected to be performed with network recoding device 130.

If, at step 1210, the interactive television application instead determines that the user did active the global option, process 1200 moves to step 1230. At step 1230, the interactive television application determines whether any of the plurality of recordings satisfies the particular criteria for performing the recording with network recording device 130. If the interactive television application determines that none of the programs satisfy the particular criteria, process 1230 moves to step 1220, described above. If instead the interactive television application determines that one or more of the recordings satisfy the particular criteria, process 1200 moves to step 1240.

At step 1240, the interactive television application determines whether network recording device 130 has sufficient space allocated to the user to perform the one or more recordings. If the interactive television application determines that network recording device 130 has sufficient space, process 1200 moves to step 1250, at which process 1200 returns to process 1000 and performs step 1040. If instead the interactive television application determines that network recording device 130 does not have sufficient space, process 1200 moves to step 1260.

At step 1260, the interactive television application automatically executes a purchase for additional space on network recording device 130. For example, the interactive television application may use a PIN provided by the user when the user activated the global option to perform recordings satisfying particular criteria with network recording device 130. In some embodiments, the global option may include additional criteria for authorizing a purchase of additional space. In such embodiments, the interactive television application may also determine whether the one or more of the recordings satisfy the additional criteria. At step 1270, process 1200 returns to process 1000 and performs step 1040.

Figure 13:
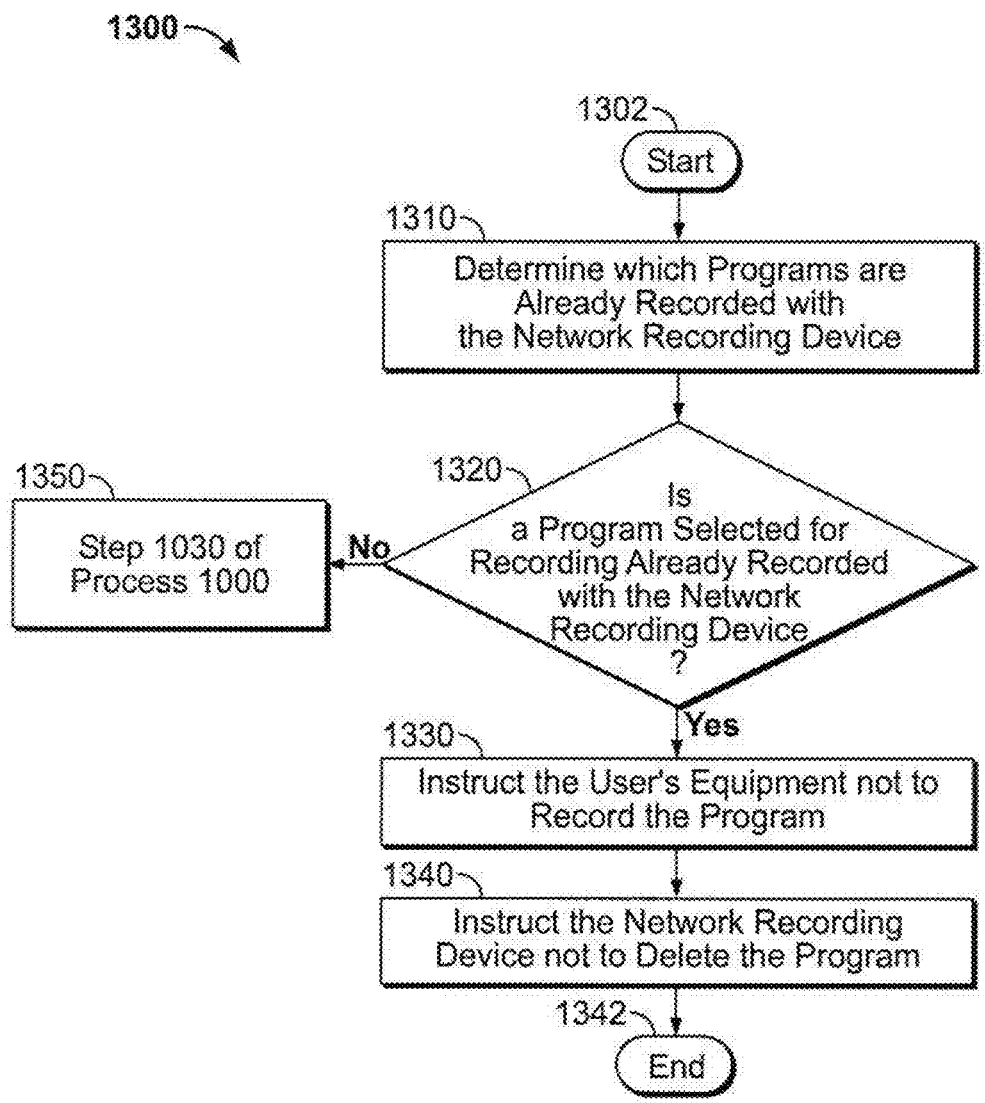
FIG. 13 shows a flow chart of an illustrative process for determining whether to record a program with the network recording device based on the programs already recorded with the network recording device in accordance with one embodiment of the present invention.

FIG. 13 is a flow chart of an illustrative process for determining whether to record a program with the network recording device based on the programs already recorded with the network recording device. Illustrative process 1300 begins at step 1302. In some embodiments, process 1300 may take place between steps 1010 and 1030 of process 1000. In such embodiments, step 1302 is step 1010 of process 1000. At step 1310, the interactive television application determines which programs network recording device 130 (FIG. 1) has already recorded. To identify previously recorded programs, the interactive television application may, for example, request and receive a list of the programs previously recorded with network recording device 130. In one or more embodiments, network recording device 130 may automatically send the interactive television application a list of the programs it has previously recorded.

At step 1320, the interactive television application determines whether a program selected for recording with user equipment 110 (FIG. 1) has already been recorded with network recording device 130. If the interactive television application determines that the program has already been recorded with network recording device 130, process 1300 moves to step 1330. At step 1330, the interactive television application instructs user equipment 110 not to record the program. At step 1340, the interactive television application instructs network recording device 130 not to delete the program. For example, control circuitry 132 (FIG. 1) of network recording device 130 may modify an entry associated with the programs in storage device 134 (FIG. 1) to set the deleting priority of the program to "do not delete," "do not flush," or "save." Process 1300 ends at step 1342.

If, at step 1320, the interactive television application instead determines that the program has not already been recorded with network recording device 130, process 1300 moves to step 1350. At step 1350, process 1300 returns to process 1000 and performs step 1040.

Figure 14:
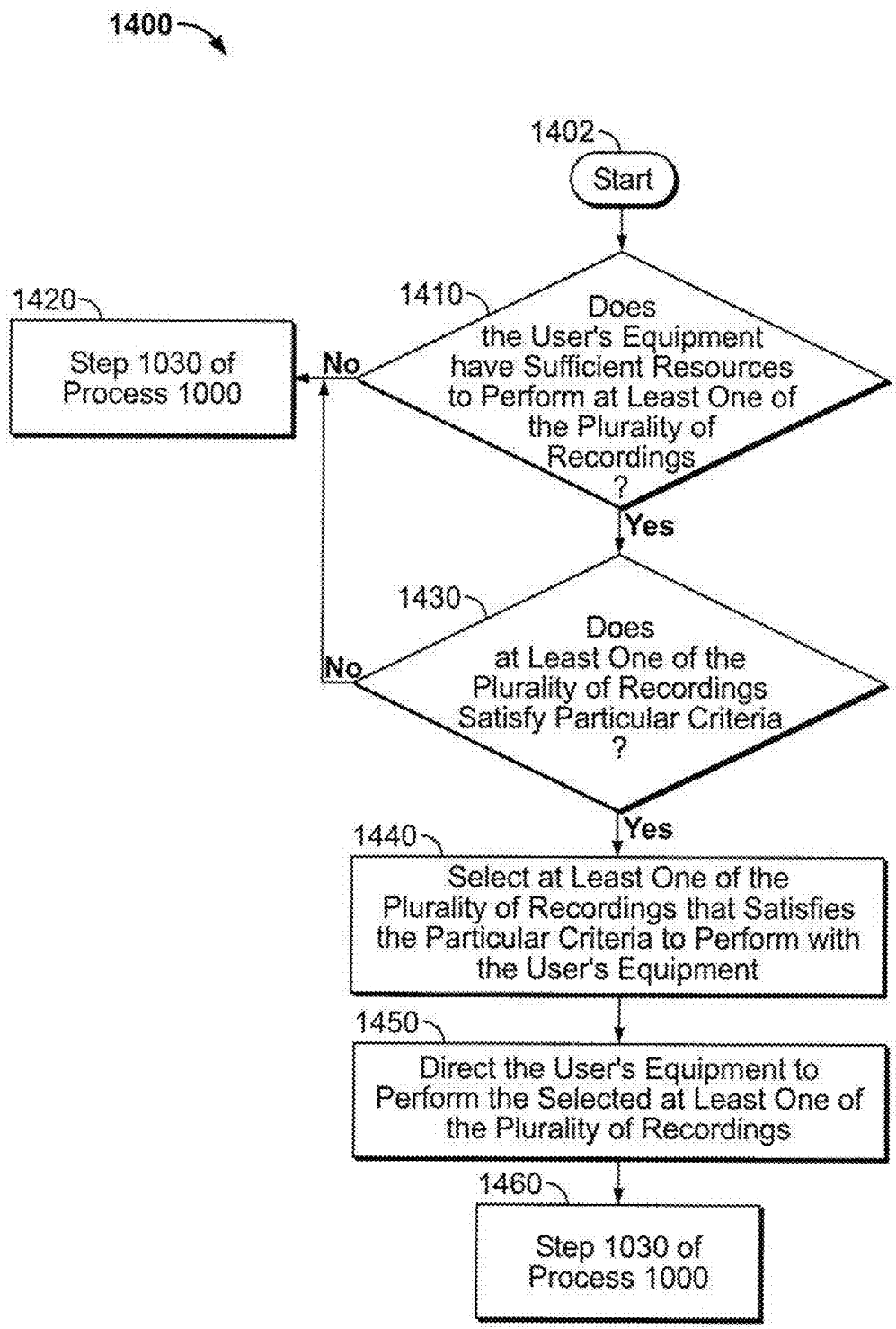
FIG. 14 shows a flow chart of an illustrative process for distributing recordings over the user's equipment and the network recording device in accordance with one embodiment of the present invention.

FIG. 14 is a flow chart of an illustrative process for distributing recordings over the user's equipment and the network recording device when the user's equipment does not have sufficient resources to perform all of a plurality of recordings. In some embodiments, process 1400 may take place between steps 1010 and 1030 of process 1000. Illustrative process 1400 begins at step 1402. At step 1410, the interactive television application determines whether user equipment 110 (FIG. 1) has sufficient resources to perform at least one of a plurality of recordings. If the interactive television application determines that user equipment 110 does not have sufficient resources to perform at least one of a plurality of recordings, process 1430 moves to step 1420, at which process 1400 returns to process 1000 and performs step 1030 (i.e., performing at least one of the recordings with network recording device 130 (FIG. 1)).

If, at step 1410, the interactive television application instead determines that user equipment 110 has sufficient resources to perform at least one of a plurality of recordings, process 1400 moves to step 1430. At step 1430, the interactive television application determines whether at least one of the plurality of recordings satisfies particular criteria. The criteria may include, for example, a recording option (e.g., recording priority), program attribute (e.g., theme or actor), or any other criteria. In some embodiments, the user may define the criteria. If the interactive television application determines that none of the plurality of recordings satisfies the particular criteria, process 1400 moves to step 1420, described above.

If, at step 1430, the interactive television application instead determines that at least one of the plurality of recordings satisfies particular criteria, process 1400 moves to step 1440. At step 1440, the interactive television application selects at least one of the plurality of recordings that satisfies the particular criteria for recording with user equipment 110.

At step 1450, the interactive television application directs user equipment 110 to perform the recordings selected at step 1440. At step 1460, process 1400 returns to process 1000 and performs step 1030 on the recordings that were not selected to be performed with user equipment 110, so as to avoid performing the same recording twice (once with each of user equipment 110 and network recording device 130).

It will be noted that all of the features described above in connection with recording a program may be applied to recording a video-on-demand program, video clip, game, series of programs, or any other content suitable for recording and display by user equipment 110. In the case of series, the interactive television application may record multiple copies of one, some, or all episodes of the series.

The above described embodiments of the present invention are presented for purposes of illustration and not of limitation, and the present invention is limited only by the claims which follow.

What is claimed is:

1. Determining that recording the media asset on a user equipment device will exceed storage space of the user equipment device; and in response to the determining that recording the media asset will exceed the storage space of the user equipment device: (a) identifying a first tier of service associated with a user of the user equipment device, wherein the first tier of service defines a first amount of storage space that is allocated to the user for recordings at a network recording device; (b) determining that the first amount of storage space defined by the first tier of service is insufficient for recording the media asset at the network recording device; (c) in response to the determining that the first amount of storage space defined by the first tier of service is insufficient for recording the media asset at the network recording device, (d) identifying a second media asset stored on the network recording device; (e) determining that storing the second media asset on the user equipment device will not exceed the storage space of the user equipment device; (f) in response to the determining that storing the second media asset on the user equipment device will not exceed the storage space of the user equipment device, transferring the second media asset from the network recording device to the second user equipment device; and (g) deleting the second media asset from the network recording device.

2. The method of claim 1, wherein the user response to the prompt comprises an instruction to purchase the additional storage space for recordings at the network recording device.

3. The method of claim 2, further comprising prompting the user for personal information required to purchase the additional storage space for recordings at the network recording device.

4. The method of claim 1, further comprising:
identifying a second media asset that is stored on both the user equipment device and the network recording device; and
deleting the second media asset from the network recording device.

5. The method of claim 1, further comprising:
receiving a request to record a second media asset;
determining that the second media asset corresponds to one of a plurality of media assets already stored on the network recording device; and
in response to the determining that the second media asset corresponds to the one of the plurality of media assets already stored on the network recording device, automatically canceling the request to record the second media asset.

6. The method of claim 1, further comprising:
determining that storing a second media asset on the user equipment device would not exceed the storage space of the user equipment device; and
in response to the determining that storing the second media asset on the user equipment device would not exceed the storage space of the user equipment device, storing the second media asset on the user equipment device.

7. The method of claim 1, wherein the media asset is a video-on-demand offering.

8. The method of claim 1, further comprising, in response to directing the network recording device to record the media asset using the additional storage space, setting a deleting priority of the media asset to do not delete.

9. The method of claim 1, further comprising:
receiving a user request to play back the media asset;
receiving the media asset at the user equipment device from the network recording device; and
playing back the media asset at the user equipment device.

10. A system for recording a media asset, the system comprising: control circuitry configured to: receive a request to record a media asset; determine that recording the media asset on a user equipment device will exceed storage space of the user equipment device; and in response to the determination that recording the media asset will exceed the storage space of the user equipment device: (a) identify a first tier of service associated with a user of the user equipment device, wherein the first tier of service defines a first amount of storage space that is allocated to the user for recordings at a network recording device; (b) determine that the first amount of storage space defined by the first tier of service is insufficient for recording the media asset at the network recording device; (c) in response to the determination the first amount of storage space defined by the first tier of service is insufficient for recording the media asset at the network recording device, (d) identify a second media asset stored on the network recording device; (e) determine that storing the second media asset on the user equipment device will not exceed the storage space of the user equipment device; (f) in response to the determining that storing the second media asset on the user equipment device will not exceed the storage space of the user equipment device, transfer the second media asset from the network recording device to the second user equipment device; and (g) delete the second media asset from the network recording device.

11. The system of claim 10, wherein the user response to the prompt comprises an instruction to purchase the additional storage space for recordings at the network recording device.

12. The system of claim 11, wherein the control circuitry is further configured to prompt the user for personal information required to purchase the additional storage space for recordings at the network recording device.

13. The system of claim 10, wherein the control circuitry is further configured to:
identify a second media asset that is stored on both the user equipment device and the network recording device; and
delete the second media asset from the network recording device.

14. The system of claim 10, wherein the control circuitry is further configured to:
receive a request to record a second media asset;
determine that the second media asset corresponds to one of a plurality of media assets already stored on the network recording device; and
in response to the determination that the second media asset corresponds to the one of the plurality of media assets already stored on the network recording device, automatically cancel the request to record the second media asset.

15. The system of claim 10, wherein the control circuitry is further configured to:
determine that storing a second media asset on the user equipment device would not exceed the storage space of the user equipment device; and
in response to the determination that storing the second media asset on the user equipment device would not exceed the storage space of the user equipment device, store the second media asset on the user equipment device.

16. The system of claim 10, wherein the media asset is a video-on-demand offering.

17. The system of claim 10, wherein the control circuitry is further configured to, in response to the directing of the network recording device to record the media asset using the additional storage space, set a deleting priority of the media asset to do not delete.

18. The system of claim 10, wherein the control circuitry is further configured to:
receive a user request to play back the media asset;
receive the media asset at the user equipment device from the network recording device; and
play back the media asset at the user equipment device.

19. A method for recording a media asset, the method comprising: receiving a request to record a media asset; determining that recording the media asset on a user equipment device will exceed storage space of the user equipment device; in response to the determining that recording the media asset will exceed the storage space of the user equipment device: identifying a first tier of service associated with a user of the user equipment device, wherein the first tier of service defines a first amount of storage space that is allocated to the user for recordings at a network recording device; determining that the first amount of storage space defined by the first tier of service is insufficient for recording the media asset at the network recording device; in response to the determining that the first amount of storage space defined by the first tier of service is insufficient for recording the media asset at the network recording device, providing a prompt for the user to request a second tier of service, wherein the second tier of service defines a second amount of storage space that is allocated to the user for recordings at the network recording device, wherein the second amount of storage space is larger than the first amount of storage space; receiving a user response to the prompt; associating the user with the second tier of service to allocate additional storage space to the user based on the user response; in response to the determining the first amount of storage space defined by the first tier of service is insufficient for recording the media asset at the network recording device, identifying a second media asset stored on the network recording device; determining that storing the second media asset on the user equipment device will not exceed the storage space of the user equipment device; in response to the determining that storing the second media asset on the user equipment device will not exceed the storage space of the user equipment device, transferring the media asset from the network recording device to the second user equipment device; and deleting the second media asset from the network recording device.

* * * * *